(12) United States Patent
Flanagan et al.

(10) Patent No.: US 6,693,220 B2
(45) Date of Patent: Feb. 17, 2004

(54) METHOD FOR SCREENING MULTIPLE REACTANTS AND CATALYST SYSTEMS USING INCREMENTAL FLOW REACTOR METHODOLOGY

(75) Inventors: William Patrick Flanagan, Rexford, NY (US); James Lawrence Spivack, Cobleskill, NY (US); Cheryl Lynn Sabourin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/233,720

(22) Filed: Sep. 4, 2002

(65) Prior Publication Data

US 2003/0055295 A1 Mar. 20, 2003

Related U.S. Application Data

(63) Continuation-in-part of application No. 09/728,751, filed on Dec. 4, 2000, now abandoned, which is a continuation-in-part of application No. 09/443,640, filed on Nov. 18, 1999, now abandoned.
(60) Provisional application No. 60/133,061, filed on May 7, 1999.

(51) Int. Cl.[7] .............................................. C07C 39/16
(52) U.S. Cl. ...................................... 568/728; 568/727
(58) Field of Search ................................. 568/727, 728

(56) References Cited

FOREIGN PATENT DOCUMENTS

| EP | 0199499 | 10/1986 |
|----|---------|---------|
| EP | 0770590 | 5/1997  |

OTHER PUBLICATIONS

"Performance Assessment of Two Patent Strains of Zymomonaz Mobilis in Batch and Continuous Fermentations", by Niels Stevnsborg et al., Applied Microbiology and Biotechnology, 25: 106–115 (1986).
"Robotic Orchestration of Organic Reactions: Yield Optimization Via an Automated System with Operator–Specified Reaction Sequences", by A. R. Frisbee et al., J. Am. Chem. Soc., 106, 7143–7145 (1984).
Rapid Optimization of an Ice Inhibitor Synthesis Using Multiple Reaction Conditions in a Parallel Array, by Joseph S. Warmus et al., Bioorganic and Medicinal Chemistry Letters, 8, 2309–2314 (1998).
"Ion–Exchange Resins for Solution Phase Parallel Synthesis of Chemical Libraries", by L. M. Gayo et al., Tetrahedron Letters, Pergamon, vol. 38, No. 4, 513–516 (1997).
"Solution–Phase Parallel Synthesis using Ion–Exchange Resins", by M. J. Suto et al., Tetrahedron Letters, vol. 54, 4141–4150 (1998).

*Primary Examiner*—Michael L. Shippen
(74) *Attorney, Agent, or Firm*—Andrew J. Caruso; Patrick K. Patnode (57) ABSTRACT

Method for producing multiple chemical reactions and for rapid screening of chemicals, catalysts, process conditions and the like is disclosed. The method includes the steps of providing an array of reactor vessels and reactants; loading each reactor vessel with at least one reactant; and allowing the reactions to proceed for a predetermined time interval. A volume increment is withdrawn from each reactor vessel and a volume increment of at least one reactant is added to each reactor vessel in the array. The steps of volume increment withdrawal and addition are repeated after successive time intervals until the reactions reach a substantially steady state. The loading, withdrawal, and addition steps are performed by liquid or solid handling robots. In one embodiment, the volume increment withdrawal occurs before, after, or contemporaneously with the volume increment addition.

43 Claims, 5 Drawing Sheets

METHOD FOR SCREENING MULTIPLE REACTANTS AND CATALYST SYSTEMS USING INCREMENTAL FLOW REACTOR METHODOLOGY

CROSS REFERENCE TO RELATED APPLICATIONS

This application is a continuation-in-part of U.S. application Ser. No. 09/728,751, filed Dec. 4, 2000 now abandoned, which claims priority to and the benefit of the filing date of U.S. Provisional Application Serial No. 60/133,061, filed May 7, 1999, entitled "INCREMENTAL FLOW REACTOR AND METHOD FOR PARALLEL SCREENING" and which is a continuation-in-part of U.S. Non-Provisional application Ser. No. 09/443,640, filed Nov. 18, 1999 now abandoned, entitled "METHOD FOR HIGH THROUGHPUT CHEMICAL SCREENING", which applications are incorporated herein by reference.

BACKGROUND OF INVENTION

The present invention is generally directed to a method for the rapid screening of chemicals, catalysts, reactants, process conditions and the like. More specifically, the present invention is directed to the use of Incremental Flow Reactor (IFR) methodology on large arrays of miniaturized reactor vessels to identify potential reactants and catalyst systems for the bulk chemical industry.

Combinatorial chemistry is a popular research tool among scientists in many different fields. High throughput and combinatorial screening for biological activity have been prevalent in the pharmaceutical industry for nearly twenty years. More recently, high throughput and combinatorial screening for improved catalysts for the bulk chemical industries have enjoyed increasing popularity. Despite their popularity, development of high throughput and combinatorial screening for production scale reactions has been lagging. This has been due in large part to the difficulty in emulating the production-scale reactions at the micro-scale level, which is necessary for this type of work. In particular, special problems can arise in reactions that are significantly dependent on flow rate or configuration.

To date, most combinatorial work has focused on "solid phase" reactions. It is known that a wide variety of organic reactions can be carried out on substrates immobilized on resins. However, a substantial number of production scale reactions are "liquid phase" or "mixed phase" and are carried out in continuous flow reactor systems.

Early efforts in high throughput screening of solutions have focused on catalyst screening. Before the application of the high throughput and combinatorial approaches, catalyst testing was traditionally accomplished in bench scale or larger pilot plants in which the feed to a continuous flow reactor was contacted with a catalyst under near steady state reaction conditions. However, rapid and combinatorial screening of reactants, catalysts, and associated process conditions requires that a large number of reactions or catalytic systems be tested simultaneously. In certain applications, screening-level data can be generated by using miniaturized batch reactors in conjunction with liquid-handling robots that aliquot the appropriate catalysts and reactants to each vial or reaction well. In other applications, however, batch reactions do not behave in the same fashion as continuous flow reactions, and could provide misleading results if the goal of screening is to identify reactants or catalyst systems that will be implemented in production-scale continuous flow reactors.

As the demand for bulk chemicals continues to grow, new and improved methods of producing more product with existing resources are needed to supply the marketplace. Unfortunately, the identification of additional effective reactants and catalyst systems for these processes continues to elude industry. There, thus, remains a need for new and improved methods for rapidly screening potential reactants, catalysts, and associated process conditions.

SUMMARY OF INVENTION

The present invention is directed to the use of IFR methodology on large arrays of miniaturized reactor vessels to produce chemical reactions that emulate those carried out in production-scale, continuous flow or continuous stirred tank reactors. With IFR, high throughput combinatorial screening of chemicals, catalysts, reactants, and associated process conditions is achieved. The use of liquid and solid handling robotic equipment to implement the IFR on numerous reactor arrays is also described.

In one embodiment the present invention is a method for producing multiple chemical reactions and catalytic systems in the reaction of at least one monohydroxyaromatic compound and at least one aldehyde or ketone to produce at least one bisphenol in batch reactors emulating the conditions of continuous reactors by incremental flow, comprising the steps of: providing a large array of reactor vessels and reactants; loading each reactor vessel with at least one reactant; and allowing the reactions to proceed for a predetermined time interval. A volume increment is withdrawn from each of the reactor vessels and a volume increment of at least one reactant is added to each reactor vessel in the array. The steps of volume increment withdrawal and addition are repeated after successive time intervals until the reactions reach a substantially steady state.

In alternative embodiments, the volume increment withdrawal can take place before, after, or contemporaneously with the volume increment addition.

DETAILED DESCRIPTION

The present invention is directed to the use of IFR on large arrays of miniature reactor vessels for the rapid combinatorial screening of chemicals, catalysts, reactants, and associated process conditions. Rapid combinatorial screening requires that a large number of reactions or catalyst systems be tested in parallel. The method of the present invention produces chemical reactions that emulate those carried out in production-scale, continuous flow or continuous stirred tank reactors, and provides useful information that may be dependent on flow rate and configuration (e.g., reaction yield; selectivity; and other reaction characteristics or process variables). With liquid and solid handling robotic equipment, increments of liquid or solid flow are delivered to and removed from the arrays of reactor vessels at predetermined time intervals to mimic the continuous flow of reactor influents and effluents. In a particular embodiment the method is useful for studying the formation of bisphenols from reactions of monohydroxyaromatic compounds with either aldehydes or ketones.

In various embodiments of the method of the present invention, the steps comprise:

(a) providing an array of reactor vessels and reactants;
(b) loading each of the reactor vessels with at least one reactant;
(c) allowing the reactions to proceed for a predetermined time interval;
(d) withdrawing a volume increment from each reactor vessel;
(e) adding a volume increment of at least one reactant to each reactor vessel; and thereafter
(f) repeating steps (c), (d), and (e) until such time the reactions reach a substantially steady state.

As used herein, the term "substantially steady state" refers to a point where the reaction effectively emulates a reaction of interest, such as those carried out in production-scale, continuous flow or continuous stirred tank reactors. As noted, certain reaction data are dependent on flow rate, residence time, or similar parameters. Utilizing the present method, these parameters can be manipulated in order to obtain useful data on a micro scale.

The volume increment withdrawal can take place before, after, or contemporaneously with the volume increment addition. The preferred order will depend on the discrete circumstances of a given application. For example, when working with micro amounts, it may be preferable to add a volume increment before withdrawal in order to maintain favorable reaction conditions within the reaction vessel. In an embodiment, the time increments are selected such that the withdrawals are made before the reactants present in the reactor vessels have had a chance to completely react, thereby ensuring substantially continuous reactivity within the reactor vessel.

Each volume increment that is added contains at least one of the reactants. The term "reactant" means any substance that affects the reaction in any capacity, including catalysts, promoters, and the like. The relative amounts of each reactant in the volume increments can be determined based on the differential depletion, exhaustion, or inactivation of each species during the course of the reaction. It is also contemplated that multiple additions of various reactants and reactant combinations can be made. In one embodiment, the total volume of the multiple additions is equivalent to the volume increment withdrawn.

Volume increments that are withdrawn can be handled in a number of ways. For example, each volume increment withdrawn from the reactor vessel can be analyzed individually for properties of interest. Selected volume increments can be analyzed, while the non-analyzed volume increments are discarded. Alternatively, withdrawn volume increments can be pooled to provide cumulative data for the entire course of the reaction or for selected time periods of interest.

In further embodiments of the present invention, automated liquid or solid robotic equipment is used to deliver and remove the volume increments from a large array of reactor vessels. Desired space velocity and reactor residence times can be obtained by controlling the size of the volume increments withdrawn and added and the size of the time intervals between volume increment additions. Unless otherwise noted, time intervals denote the period of time between successive volume additions.

The effective liquid residence time in the reactor vessels can be defined by the following relationship:

$$RT = \frac{V_{tot} \cdot \Delta t}{\Delta V}$$

wherein:
$\Delta t$=time interval;
$\Delta V$=volume increment;
RT=residence time; and
$V_{tot}$=total liquid volume in the reaction vessel.

Similarly, the effective liquid flow rate (Q) can be defined by the following relationship:

$$Q = \frac{\Delta V}{\Delta t}$$

It is evident that the behavior of the present incremental flow method approaches that of a continuous stirred tank reactor as the time interval and volume increments approach zero:

$$\lim_{\Delta t, \Delta V \to 0} (IFR) = \text{continuous stirred tank reactor } (CSTR)$$

Conversely, as the volume increment approaches the total liquid volume in the reactor vessel, the behavior of the incremental flow method approaches that of a sequential series of batch reactions:

$$\lim_{\Delta V \to V} (IFR) = \text{sequential series of batch reactions}$$

Figure 1:
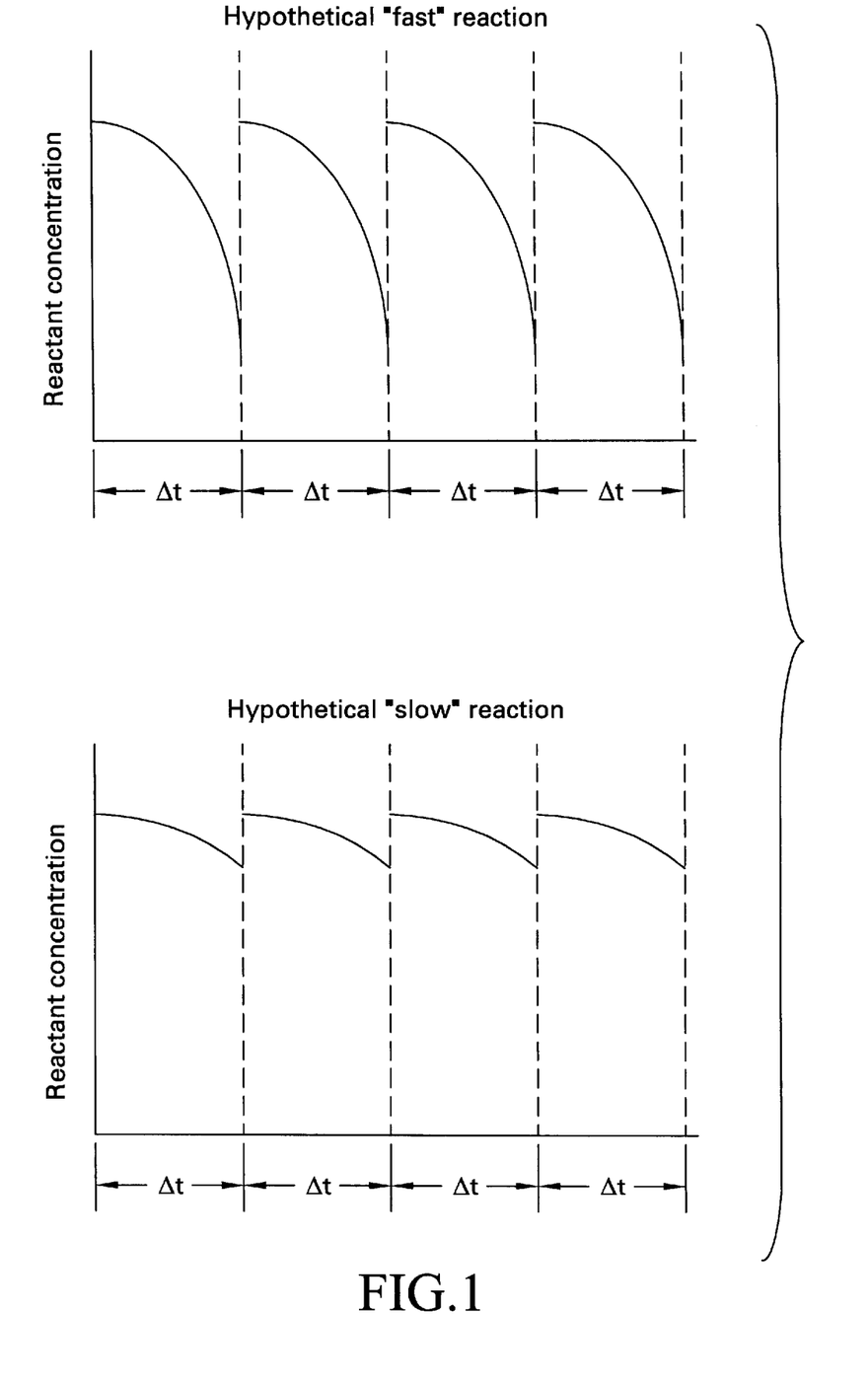
FIG. 1 is a graphical representation of concentration gradients of various reactions.

The selection of optimal $\Delta t$ and $\Delta V$ values will depend on several factors, including reaction kinetics and the capabilities of the liquid-handling equipment. As shown in FIG. 1, a faster reaction will generally exhibit larger concentration gradients within a given time interval than a slower reaction. Preferably, for a given reaction system, the $\Delta t$ and $\Delta V$ values should be chosen to minimize the within-increment concentration gradients without placing excessive demands on liquid handling equipment.

Accordingly, it may be useful to determine the sub-interval concentration gradients at various points throughout the course of the reactions. Not only can this information be useful in verifying that appropriate $\Delta t$ and $\Delta V$ values have been chosen, it could also provide valuable insight regarding reaction kinetics. Such information can be obtained by establishing reactions of the type as described above. In other words, allow the reaction to proceed for a time interval, followed by controlled addition and withdrawal of nominal volume increments until the reaction reaches a point of interest. When concentration gradient information is desired, a sample volume increment is added that is larger (e.g., about two to three times larger) than the nominal $\Delta V$. Volume sub-increments are then withdrawn at appropriate subintervals within the time interval, such that the sum of the volume sub-increments is equivalent to the sample volume increment. Analysis of the withdrawn sub-increments provides desired concentration gradient data. The reactions are allowed to continue until sub-interval concentration gradient information is again desired, at which point the steps for obtaining such information can be repeated.

In a further alternative embodiment, volume increment withdrawals are effected by inserting a probe to a predetermined level in the reactor vessels and withdrawing reactor fluid until no further fluid can be withdrawn. In this manner, the probe acts as a liquid level controller, thereby ensuring that the liquid level in the reactor vessels will be the same at the end of each time interval. When using a robotic probe, the efficacy of this approach depends, inter alia, on how accurately and reproducibly the probe can be positioned at the desired liquid level.

This embodiment reduces or eliminates the possibility of cumulative volume error related to the accuracy of incremental volume withdrawals and also compensates for error related to the accuracy of incremental volume additions. For example, if a slightly larger than desired volume increment is added at the beginning of a time interval, a similarly larger volume increment will be withdrawn at the end of that time interval since the volume increment removal is based on a liquid level control mechanism. Conversely, a smaller than desired volume increment addition would be compensated for by a smaller volume increment removal.

In various embodiments the present invention may be employed in producing any chemical reaction run in a batch or flow through reactor under kinetic control because the product forms and is removed before it can reach thermodynamic equilibrium. Some particular examples of suitable reactions under kinetic control include, but are not limited to, enolate formation in enolizable compounds and ortho-directed lithiations in substituted aromatic compounds using hindered bases such as lithium diethylamide, lithium diisopropylamide, lithium bis(trimethylsilyl)amide, lithium tetramethylpiperidide, and the like; metal-halogen exchange; kinetically controlled rearrangements such as Ireland-Claisen rearrangements; de-symmetrizations and kinetic resolutions, where a chiral catalyst is used with a racemic or enantiotopic substrate wherein one enantiomer (or enantiotopic site, respectively) reacts faster than the other, and wherein it is desired to obtain either the product or the unreacted enantiomer of the staring material; selective oxidations, for example of cyclic hydrocarbons, aromatic compounds, alkylated aromatic compounds, or alcohols, for example using selenium dioxide or hydrogen peroxide in the presence of homogeneous catalysts, for example comprising cobalt or copper, or heterogeneous catalysts, for example comprising a zeolite or supported catalyst; selective epoxidation; Sharpless epoxidation; Pd catalyzed reactions; Heck reactions; selective reductions; reductive aminations, for example wherein an iminium ion is reduced faster than a carbonyl substrate; enantioselective protonations; ring-opening polymerization of trifluoropropyl methyl cyclotrisiloxane with a base to make a fluorosilicone; dehydrohalogenations of compounds bearing more than one halogen; transesterification reactions; ether exchange reactions; redistributions in cyclic and/or linear siloxanes; nitrations; chlorinations; brominations; iodinations; and fluorinations.

In some particular embodiments the present invention may be employed in producing chemical reactions between at least one monohydroxyaromatic compound and at least one aldehyde or ketone to produce a bisphenol. Suitable monohydroxyaromatic compounds include, but are not limited to, substituted and unsubstituted monocyclic, monohydroxyaromatic compounds and substituted and unsubstituted polycyclic, monohydroxyaromatic compounds, illustrative examples of which include substituted and unsubstituted phenols and naphthols. Substituents, when present, include, but are not limited to, one or more of alkyl, alkenyl, alkoxy, cyano, or halogen substituents and mixtures thereof, such as $C_1$–$C_{30}$ straight-chain, branched, or cyclo-alkyl, methyl, ethyl, propyl, isopropyl, n-butyl, isobutyl, tertiary butyl, allyl, chloro, bromo, and fluoro. In some particular embodiments monohydroxyaromatic compounds include at least one of phenol, methylphenol, chlorophenol, bromophenol, dimethylphenol, dichlorophenol, or dibromophenol.

Suitable aldehydes include, but are not limited to, aryl aldehydes and alkyl aldehydes comprising 1–30 carbon atoms. In a particular embodiment suitable aldehydes include alkyl aldehydes with alkyl groups comprising 1–30 carbon atoms. Alkyl groups may be straight-chain, branched, or cyclic. Illustrative examples of aldehydes include, but are not limited to, acetaldehyde, benzaldehyde, butyraldehyde, hexanal, methylhexanal, heptaldehyde, heptenal, octyl aldehyde, nonyl aldehyde, decyl aldehyde, dodecyl aldehyde, tridecanal, and valeraldehyde. Suitable ketones include, but are not limited to, arylalkyl ketones, and symmetrical and unsymmetrical dialkyl ketones. Alkyl groups and arylalkyl groups comprise 1–30 carbon atoms. In unsymmetrical dialkyl ketones each alkyl group independently comprises 1–30 carbon atoms. Alkyl groups may be straight-chain, branched, or cyclic. Alkyl groups and aryl groups may be substituted or unsubstituted. In some embodiments the alkyl groups of the dialkyl ketone may be connected to form a cyclic ketone. Illustrative examples of ketones include, but are not limited to, acetone, butanone, methylbutanone, heptanone, methylheptanone, hexanone, methylhexanone, pentanone, methylpentanone, octanone, nonanone, decanone, undecanone, ethyl vinyl ketone, adamantanone, decalone, cyclohexanone, cyclodecanone, cyclododecanone, and acetophenone.

Bisphenols produced by reaction of at least one monohydroxyaromatic compound and at least one aldehyde or ketone include, but are not limited to, those with the structure of formula (I):

(I)

wherein $A^1$ represents an aromatic group such as phenylene, naphthylene, and the like. E may be a $C_1$–$C_{30}$ alkylene or alkylidene group such as methylene, ethylene, ethylidene, propylene, propylidene, isopropylidene, butylene, butylidene, isobutylidene, amylene, amylidene, isoamylidene, and the like. In addition, E may be a $C_1$–$C_{30}$ cycloaliphatic group e.g., cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like. $R^1$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, or $R^1$ above, or an oxy group such as OR wherein R is a $C_1$–$C_{30}$ alkyl group; it being only necessary that $Y^1$ be inert to and unaffected by the reactants and reaction conditions used to prepare the bisphenol. The letter "m" represents any integer from and including zero through the number of positions on $A^1$ available for substitution; and "p" represents an integer from and including zero through the number of positions on E available for substitution.

In bisphenols of formula (I) above, when more than one Y substituent is present, they may be the same or different. The same holds true for the $R^1$ substituent. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments bisphenols are of the formula (II):

(II)

where independently each R is as defined hereinbefore, and independently $R_g$ and $R_h$ are hydrogen or a $C^{1-30}$ monovalent hydrocarbon group. In some embodiments $R_g$ and $R_h$ may be joined to form at least one ring.

Some illustrative, non-limiting examples of bisphenols of formula (I) include 4,4'-(3,3,5-trimethylcyclohexylidene)-diphenol; 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; (3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,2-bis(4-hydroxyphenyl)butane; 2,2-bis-(4-hydroxyphenyl)-2-methylbutane; 1,1-bis(4-hydroxyphenyl)cyclohexane; 2-(3-methyl-4-hydroxyphenyl-2-(4-hydroxyphenyl)propane; 2-(3,5-dimethyl-4-hydroxyphenyl)-2-(4-hydroxyphenyl)-propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis-(3,5-dimethylphenyl-4-hydroxyphenl)ethane; 2,2-bis-(3,5-dimethylphenyl-4-hydroxyphenyl)propane; 2,4-bis(3,5-dimethylphenyl-4-hydroxyphenyl)-2-methyl-butane; 3,3-bis-(3,5-dimethylphenyl-4-hydroxyphenyl)pentane; 1,1-bis-(3,5-dimethylphenyl-4-hydroxyphenyl)cyclopentane; and 1,1-bis-(3,5-dimethylphenyl-4-hydroxyphenyl)cyclohexane.

EXAMPLES

The following prophetic example is based on a mathematical reaction kinetic model and compares incremental flow reactor behavior with continuous stirred tank reactor behavior.

The dihydric phenol 2,2-bis(p-hydroxyphenyl)propane (commonly referred to as "bisphenol-A", "BPA" or "pp-BPA") is commercially prepared by condensing 2 moles of phenol with a mole of acetone in the presence of an acid catalyst. The phenol is typically provided in molar excess of the stoichiometric requirement. Optional reaction promoters, such as free mercaptans, can be added to aid the reaction. Common acid catalysts for the production of BPA include acidic ion exchange resins, such as sulfonic acid, substituted polystyrene, and the like.

For purposes of discussion, assume that the ion exchange resin-catalyzed formation of BPA from phenol and acetone is conducted in continuous-flow reactors at a space velocity of 2.33 g liquid feed/g resin/hr. For a small vial containing 150 mg resin and 1000 μL liquid volume, the corresponding liquid flow rate for a true continuous flow reactor would be 338 μL/hr (assuming a liquid feed specific gravity of 1.018 g/mL). To mimic continuous flow in the small vial example using the IFR method, the following sequence would be followed.

Figure 2:
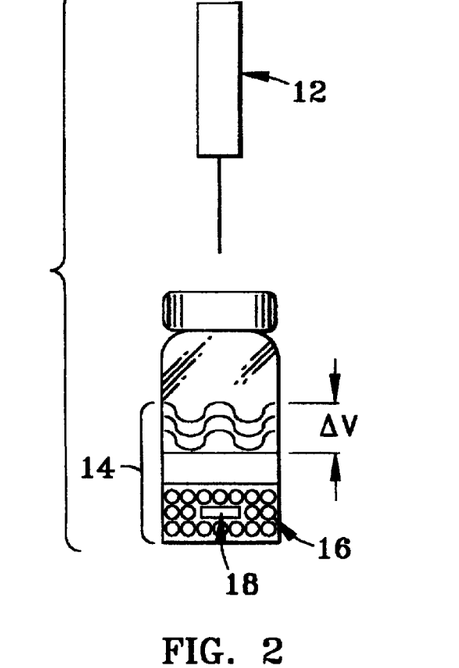
FIG. 2 illustrates the IFR method as applied to a single reaction vial.

Referring to FIG. 2, each vial or reaction well is loaded with the appropriate mixture of phenol:acetone feed 12. The feed can contain optional promoter(s) and catalyst(s). Each vial is provided with resin beads 16 and an optional stir bar 18.

The reaction is allowed to proceed in batch mode for one time interval, Δt. Near the end of this time interval, a probe (not shown) withdraws one liquid volume increment, ΔV, of reaction mixture 14 from the vial (reactor effluent). The withdrawn volume increment is replaced with an equal volume increment, ΔV, of fresh feed 12. Cycle time, Δt, is defined as the time period between successive volume increment additions. The incremental withdrawal and addition of reactants is continued until the reaction reaches a substantially steady state, and screening data are collected.

The values of the time intervals and volume increments (Δt and ΔV) can be selected to obtain a desired space velocity. The relationship between the time intervals and volume increments is as follows:

$$\Delta t = \frac{\rho \cdot \Delta V \cdot 60}{SV \cdot R}$$

wherein:
Δt=time interval;
ΔV=volume increment added;
ρ=density of liquid feed;
SV=space velocity; and
R=amount of resin.

Figure 3:
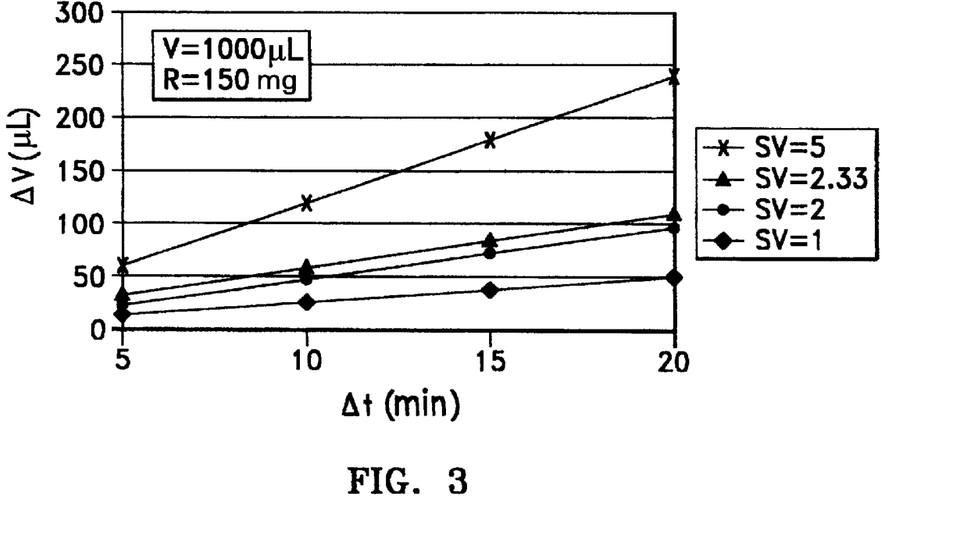
FIG. 3 is a graphical representation of the relationship among various reaction conditions.

The relationship between Δt and ΔV is illustrated in FIG. 3 for the present example ($V_{tot}$=1000 μL; resin amount=150 mg/L; space velocity=2.33 g liquid flow/g resin/hr), along with results for a range of other space velocities.

Figure 4A:
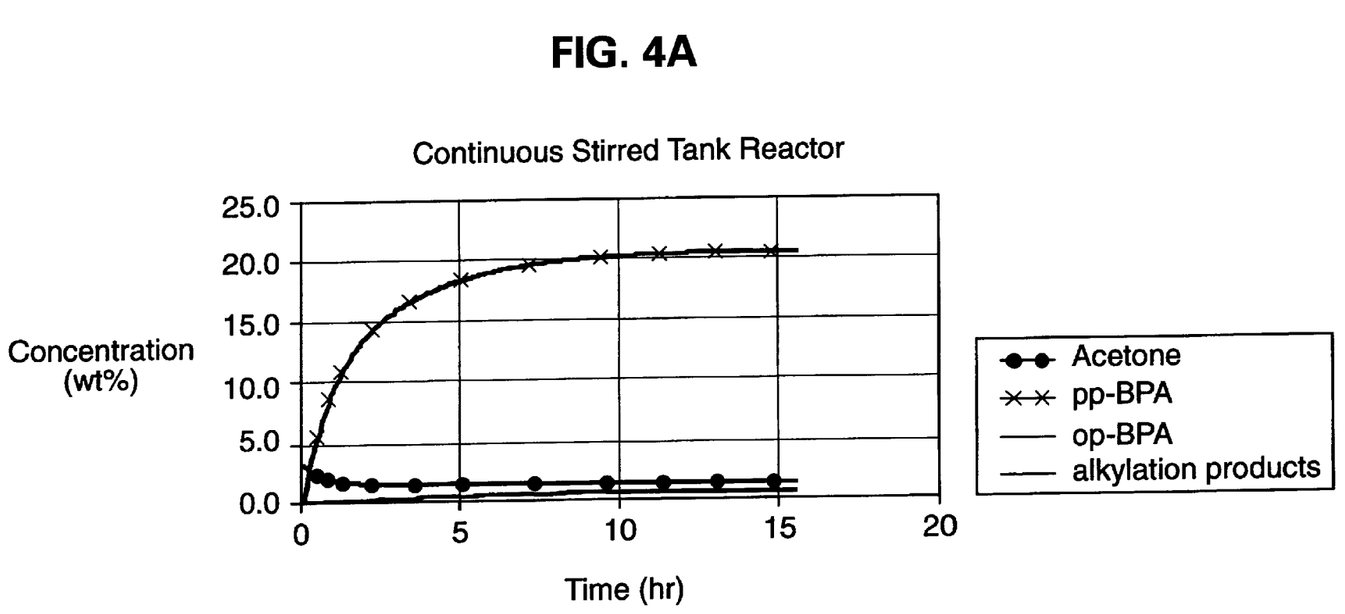
FIG. 4 is a graphical representation of a reaction kinetics model comparing a continuous stirred tank reactor with an incremental flow reactor.
Figure 4B:
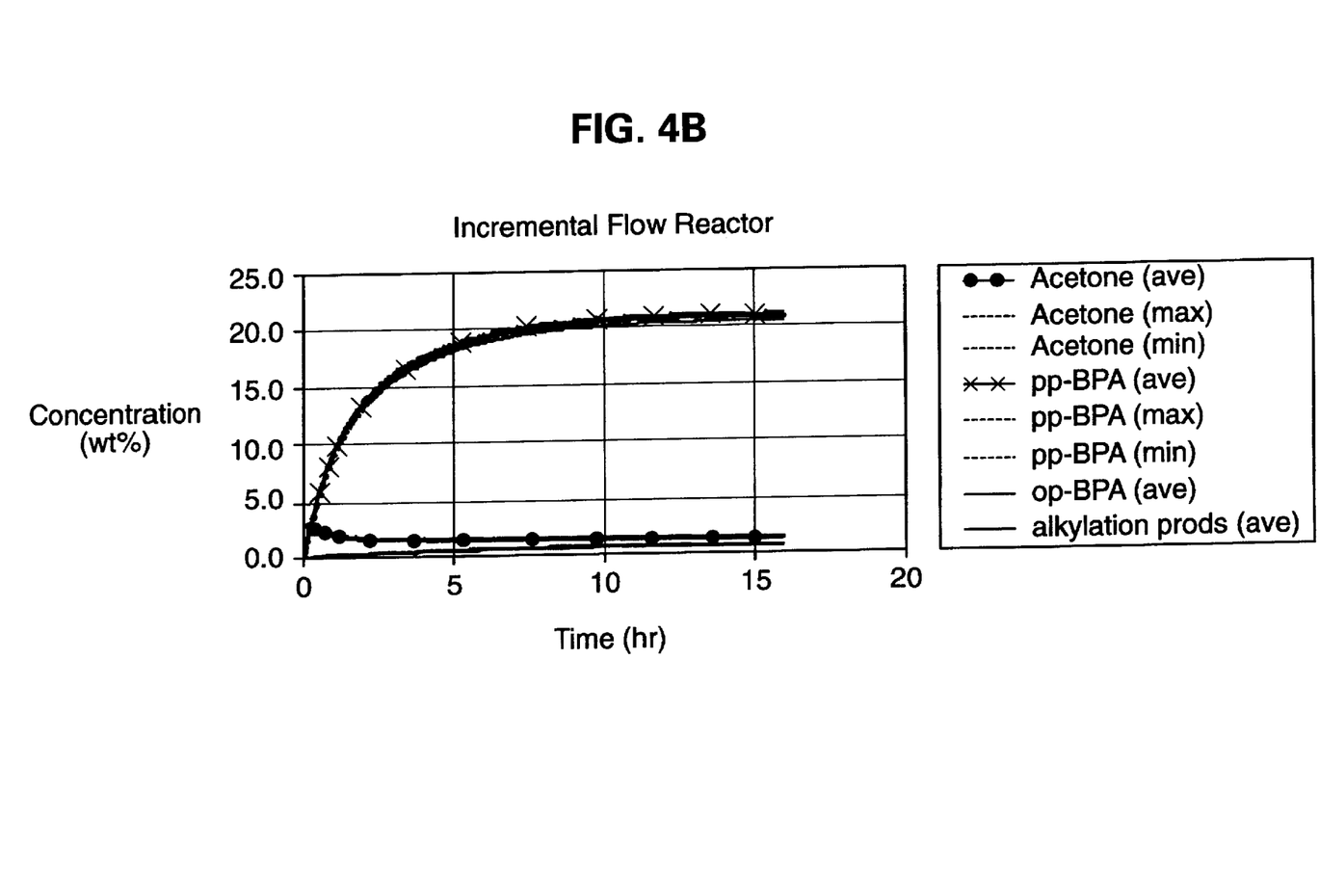

FIG. 4 is a comparison of the IFR method and a traditional continuous stirred tank reactor (CSTR). The plots were generated using mathematical reaction kinetics models with the following parameters:

| | |
|---|---|
| Δt = 5.7 minutes | $k_{pp}$ = 1 hr$^{-1}$ |
| ΔV = 30 μL | $k_{op}$ = 0.005 hr$^{-1}$ |
| Space velocity = 2.33 g liquid feed/g resin/hr | $k_{isofwd}$ = 0.01 hr$^{-1}$ |
| Resin amount = 150 mg | $k_{isorev}$ = 0.01 hr$^{-1}$ |
| Liquid volume in reactor = 1000 μL | $k_{alk}$ = 0.01 hr$^{-1}$ |
| Initial acetone in reaction vials = 0 wt % | |
| Acetone in feed = 4.67 wt % | |

The hypothetical model reactions are shown below:

Acetone + 2 Phenol $\xrightarrow{k_{pp}}$ pp-BPA

-continued

It should be apparent from the graphic representations in FIG. 4 that the IFR method closely emulates the CSTR under the stated conditions.

To enable high-throughput combinatorial screening of chemicals, catalysts, and process conditions, the IFR method was used on many arrays of miniaturized reactor vessels using liquid handling robotic equipment such as the Gilson Multiprobe 215 Liquid Handler (Middleton, Wis.). Experimental data was generated using the IFR methodology on two systems: 1) a single-probe liquid handling robot to operate a one-dimensional array of 12 IFRs (1 column×12 rows); and 2) an 8-probe liquid-handling robot to operate a two-dimensional array of 96 IFRs (8 columns×12 rows).

The following modifications were made to the Gilson Multiprobe 215 Liquid Handler. These modifications were necessary in order to work with phenol or other chemicals that are solid (rather than liquid) at room temperature. It should be noted that if the chemicals being used are liquid at room temperature, the modifications described below would not be necessary to implement the IFR methodology.

Heat-traced all transfer lines. The transfer lines are flexible tubes connecting the individual syringe pump heads to the liquid-handling probes. These lines contain a "system fluid." In order to collect a liquid sample with the liquid-handling probe, a motor-driven syringe pulls a desired volume of system fluid through the transfer line which, therefore, draws the same volume of sample fluid into the probe. To dispense the sample fluid from the probe, the motor-driven syringe pushes the desired volume of system fluid out through the transfer line, thereby displacing the sample fluid from the probe. The transfer lines must be kept warm (60° C.) in order to prevent "freezing" of the sample fluids in the probe. The transfer lines are, therefore, sheathed in an electrically-heated wrapping.

Heat-traced rinse station to prevent freezing of phenol-containing rinsates. After collecting and dispensing a particular liquid sample, the probes can be rinsed with system fluid by lowering the 8 probes into a rinse station and flushing with system fluid. The system fluid is pumped out through the probes and then flushed out of the rinse station to a drain line. The rinse station is electrically heated to prevent freezing of phenol-containing rinsates.

Heat-traced drain line to prevent freezing of phenol-containing rinsates in the line leading from the rinse station to the waste collection reservoir. In the present invention, ¼" copper tubing was used for the drain line. The tubing was wrapped with commercially-available heat tape (electrical) to keep it warm.

Several heating blocks were custom-built to keep the chemicals warm during the experiments. The heating blocks were mounted on the liquid-handling robot's deck. Each is described individually as follows:

a) Heating block for stock solutions. Stock solutions (containing reactants such as phenol, acetone, and promoter) were stored in 48-well deep-well micro-titre plates. These solutions were the "feeds" to the 96 reaction vials. The 48-well plates were clamped within an aluminum frame and bolted to an aluminum base. The base was heated with electrical cartridge heaters. Power to the electrical heaters was regulated by a temperature controller based on feedback from a thermocouple mounted in the aluminum base.

b) Heating block for phenol reservoirs. Phenol was used for rinsing of the probes, and for insulating the feeds and samples (i.e., the "incremental volumes") from the system fluid. In other words, before the probes collected feed or sample volumes, they first collected a small volume of fresh phenol, then a small air gap. This was done so that the feed and sample volumes did not become contaminated by direct contact with the system fluid. The fresh phenol used for this purpose had to be kept warm, so glass-lined or polypropylene-lined aluminum "boxes" were constructed to hold the molten phenol. The boxes were mounted on an aluminum base that was electrically heated as previously described. In this case, the power to the electrical heaters was regulated by a temperature controller based on feedback from a thermocouple placed in the Al wall of the boxes.

c) Heating block for 96-well reactor array. The reactor wells or vials must also be kept warm since they contain phenol. In the present invention, a form-fitting aluminum mold was fabricated to fit into the underside of the 96-well polypropylene micro-titre plate that was used as the reactor array. The assembly was placed into a Reacti-Therm III Heating/Stirring Module (Pierce; Rockford, Ill.), which kept the reactor array assembly at the desired temperature. This modification is required for the IFR (independent of whether one uses a high melting solvent or not) because reaction temperature control is essential: the Al mold reduced well to well T variation from about 2–3° C. to about 0.2° C.

The choice of system fluid is quite important. Molten phenol (with an additive to help keep it from freezing) was initially used as a way to minimize contamination of the feed and sample volumes with foreign chemicals in the system fluid. It was discovered, however, that the phenol was swelling the internal parts of the valves in the syringe pump assembly, thereby resulting in valve failure. To avoid this problem, a suitable solvent is now used as the system fluid. Contamination of feed and sample volumes is prevented by the aforementioned use of a phenol/air gap between the system fluid and the feed or sample volumes.

Various embodiments of the present invention are described below.

A single-probe Gilson 215 liquid-handling robot was used to implement the IFR methodology on a limited number of reactor vessels, for example, a one-dimensional array of 12 IFRs. The robotic probe sequentially addressed each reactor in the array until the entire array was addressed. The robotic probe then returned to the first reactor in the array and repeated the process. The IFR methodology was implemented in several different ways.

The robotic probe removed a liquid volume increment from the first reactor, and then immediately delivered an increment of fresh feed to the first reactor. This process was then repeated for the second reactor, then the third, and so on, until all reactors in the array had been addressed. The robotic probe then returned to the first reactor and repeated the process. In this manner, a single "time interval" of the IFR method was carried out each time the robotic probe cycled through the array of reactor vessels.

The robotic probe removed a liquid volume increment from the first reactor, then removed a liquid volume increment from the second reactor, and so on, until liquid volume increments had been removed from all reactors in the array. Then, the robotic probe delivered an increment of fresh feed to the first reactor, then delivered an increment of fresh feed to the second reactor, and so on, until all reactors in the array had been addressed. In this manner, the robotic probe cycled through the array of reactor vessels twice in order to carry out a single "time interval" of the IFR method.

Other variations of the IFR methodology can also be implemented as described in U.S. patent application Ser. No. 10/180,870, filed Jun. 26, 2002, the reference being hereby incorporated by reference. For example, large volume additions followed by sequential removals of smaller volume increments can be used to obtain reaction kinetic data at various points throughout the course of the reaction. Alternatively, two additions of different reactants can be followed by removal of single or multiple volume increments. Further, single or multiple additions of multiple reactants can be followed by removal of single or multiple volume increments.

The single-probe approach is not limited to the specific examples described herein. The IFR method can be applied to either one-dimensional or small two-dimensional arrays. In practice, however, the number of reactors that can be addressed with a single-probe robot is limited by the ability of the robot to deliver and remove liquid volume increments to all the reactors in the array at the desired time intervals.

Figure 5:
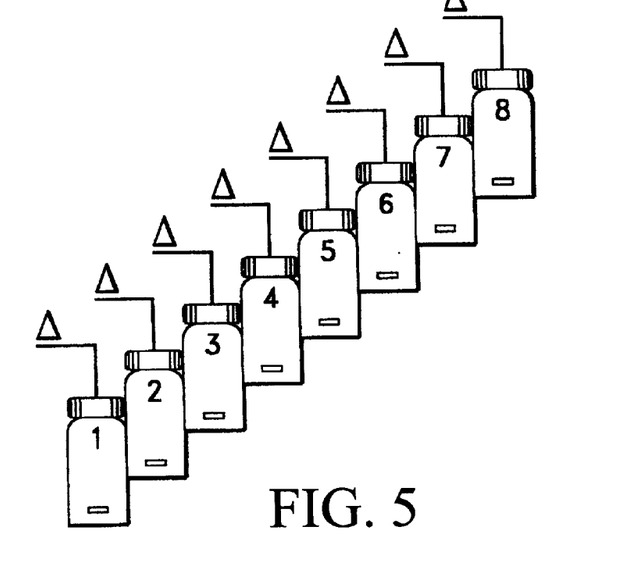
FIG. 5 illustrates the IFR method as applied to 8 reaction vials using an 8-probe liquid handling robot.

An eight-probe liquid-handling robot was used to conveniently implement the IFR methodology on a 96-reactor (8×12) array. In the method of the present invention, the eight robotic probes aligned directly with the first row of eight reactors as shown in FIG. 5. The eight probes simultaneously addressed the eight reactors in the first row, and then moved on to the second row, and so on, until all rows in the array had been addressed. Any variation of the IFR methodology discussed above can also be implemented using the eight-probe liquid-handling robot.

Figure 6:
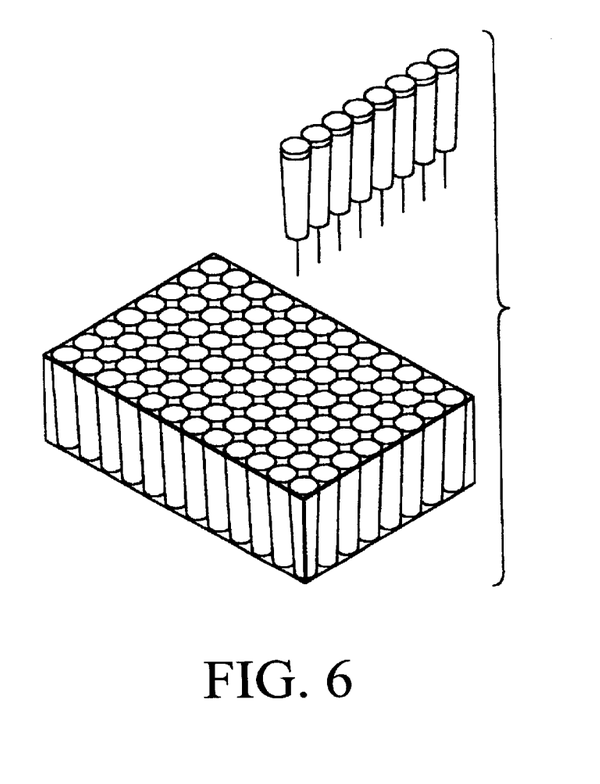
FIG. 6 illustrates the IFR method as applied to a 96-well micro-titre plate using an 8-probe liquid handling robot.

Any type of liquid-handling robot which is fitted with any number of probes or tips can also be used to implement the IFR methodology on an array of reactor vessels. Further, any robotic liquid-handling device which utilizes an array of probes or pipette tips that is geometrically identical to the array of miniature reactor vessels can be used to simultaneously implement the IFR methodology on all of the reactor vessels in the array. For example, a commercially-available robotic liquid handling device equipped with 96 tips in a standard 8×12 array can be used to simultaneously address a 96-reactor array as shown in FIG. 6. Liquid volume increments can be simultaneously removed from all 96 reactors, and then liquid volume increments of fresh feed is simultaneously added to all 96 reactors.

The IFR methodology may be applied to any type or geometric configuration of miniature reactor arrays. This includes: 1) micro-titre plates of any size, including 48 wells (8×6 array), 96 wells (8×12 array), 384 wells (15×24 array), 1536 wells (32×48 array), or any other number of wells; and 2) any array of glass (or metal or plastic or any other material) vials, tubes, bottles, cups, or any other suitable container. FIG. 6 illustrated the IFR method as applied to a 96-well micro-titre plate using an 8-probe liquid-handling robot. The robot simultaneously addresses 8 reaction wells in a single row, then moves to the next row, etc. The micro-titre plate has overall exterior dimensions of 3¼"× 5"×2¾". Each well is capable of holding less than 2 mL of liquid volume. By combining a 96 tip liquid handler with block handling robots and sufficient heaters with stirrers or shakers, this IFR method can be extended to include arrays of many 96 well blocks simultaneously reaching steady states for analysis. Thus, potentially, hundreds of reactors could be simultaneously addressed.

The following sequence is representative of the actual IFR method used in the present invention. The sequence is not intended to be limited to the details described, since various modifications and substitutions can be made without departing from the spirit of the present invention.

For discussion purposes only, each reaction well contained 50 mg of resin beads and 200 $\mu$L of phenol:acetone; the volume increments of fresh feed/sample were 30 $\mu$L.

Molten phenol was poured into the phenol reservoirs and maintained at the appropriate temperature (about 80° C.). The reactor well array (96-well deep-well micro-titre plate) was loaded with the appropriate amount of resin beads (about 25–65 mg), along with phenol (total liquid volume typically ranges between about 150–400 $\mu$L). Optionally, the resin beads underwent a pre-treatment step to attach a promoter to the resin beads (in other experiments, the promoter was not attached to the beads but was, instead, included in the stock solutions). The reactor array was placed into the Reacti-Therm III heating/stirring module and maintained at the appropriate reaction temperature (about 60–90° C.).

Stock solutions containing phenol, acetone, and possibly a promoter were loaded into a 48-well deep-well micro-titre plate. The ratio of acetone:phenol is an experimental variable, but a typical experiment might involve the use of about 2–9% acetone (by weight) in phenol. A 48-well plate (rather than a 96-well plate) was used because each reaction system was run in duplicate. Therefore, each of the 48 stock solution wells were used to feed two separate reactor wells. The stock plates were clamped into the heated block and maintained at an appropriate temperature (typically ~60° C.).

The system reservoir was topped-off with an appropriate solvent, which was either maintained at room temperature or heated using a heating mantle. 96 empty well microtitre plates were placed at the appropriate position on the liquid-handling robot's deck. These plates were used for sample collection.

The probes were dipped into the first phenol reservoir to rinse the system fluid (and other contaminants) off the outside of the probes. The probes were then moved to the second phenol reservoir and a small volume of phenol was simultaneously loaded into each probe. The probes were pulled out of the phenol reservoir and an air gap was put into each probe. The probes were then moved to the stock block, and a (30 $\mu$L) aliquot of fresh feed was pulled into each probe. It should be noted that at this point, each probe was in a different well of the stock block, so different stock solutions can be loaded into the different probes.

The probes were then moved to the first row of the reactor array, and the (30 $\mu$L) aliquots of fresh feed were delivered to the reactor wells. The probes were then moved to the rinse station, and a volume (250 $\mu$L) of system fluid was expressed through the probes to rinse out the phenol and feed solutions.

All operational steps previously described were then repeated for the second row of the 8 reaction wells, and then again in the same fashion for the third through twelfth rows. At this point, an increment of fresh feed has been delivered to all 96 reaction wells. Now the robot returns for another pass (described as follows), this time removing 30 $\mu$L aliquots of sample from each reaction well. The probes may need to idle a while until the appropriate time interval has passed before starting in on another cycle.

The first step of the new cycle involved rinsing each probe in the first phenol reservoir to remove any system fluid and contaminants from the outside of the probe. Next, the probes were then moved to the second phenol reservoir and a small volume of phenol was simultaneously loaded into each probe. The probes were pulled out of the phenol reservoir and an air gap was put into each probe. The probes were then moved to the first row of 8 reaction wells, and set at a pre-determined height above well bottom. The robot was then programmed to attempt to remove more than 30 μl (about 45 μL). This step serves as a level control and corrects for systematic differences between aspiration and dispensing volumes. In other words, if the robot is programmed to add 30 μL and, in this step, remove 30 μL, systematic errors may occur which lead to either a build up or loss of standing volume in the reactor wells. This solution represents one way to overcome this problem with liquid handling robots. The removed samples were either deposited in a waste container or in one of the sample blocks for analysis later. The probes were then moved to the rinse station, and a volume (250 μL) of system fluid was expressed through the probes to rinse out the phenol and the sample aliquots. The steps beginning with the initial rinsing step (to remove the system fluid and contaminants) of each probe through the final rinse step (to remove the phenol and sample aliquots) were then repeated for the second row of the 8 reaction wells. The steps were again repeated in the same fashion for the third through twelfth rows.

At this point, a complete add and remove cycle has been performed. This is typically accomplished within about 15 minutes. This add and remove cycle is then repeated about 40 times (about 10 hours). This cycle is variable. The last add and remove cycle was slightly different. After the samples had been removed from the reaction wells, the probes were moved to the sample collection micro-titre plates and the samples were delivered to the appropriate row of wells for subsequent analysis. Then, the probes were rinsed, and the procedure continued. As previously noted, sampling for analysis can be done during any cycle and the time course of the reactor can be measured.

Following delivery of the sample aliquots to the sample collection micro-titre plates, the sample plates were removed from the liquid-handler's deck and prepared for gas chromatographic analysis.

All references described herein are incorporated by reference in their entirety.

While the invention has been illustrated and described as embodied in a method for high throughput chemical screening, it is not intended to be limited to the details shown, since various modifications and substitutions can be made without departing in any way from the spirit of the present invention. For example, various detection techniques may be incorporated into the method to provide data at accelerated rates. Also, quite often an intermediate time-point set of samples is collected in addition to the end-point set of samples. In this instant, procedurally, the add and removal cycle previously described can be inserted into the operational procedure at any point in the experiment for which data is required.

Further modifications and equivalents of the embodiments herein disclosed may occur to persons skilled in the art using no more than routine experimentation, and all such modifications and equivalents are believed to be within the spirit and scope of the invention as defined by the following claims.

What is claimed is:

1. A method for producing multiple chemical reactions and catalytic systems in the reaction of at least one mono-hydroxyaromatic compound and at least one aldehyde or ketone to produce at least one bisphenol in batch reactors emulating the conditions of continuous reactors by incremental flow, comprising the steps of:

(a) providing an array of reactor vessels and reactants;
   (b) loading each of the reactor vessels with at least one reactant;
   (c) allowing the reactions to proceed for a predetermined time interval;
   (d) withdrawing a volume increment from each reactor vessel;
   (e) adding a volume increment of at least one reactant to each reactor vessel; and thereafter
   (f) repeating steps (c), (d), and (e) until such time the reactions reach a substantially steady state.

2. The method of claim 1, wherein the reactants include a substituted or unsubstituted monocyclic, monohydroxyaromatic compound, or a substituted or unsubstituted polycyclic, monohydroxyaromatic compound.

3. The method of claim 2, wherein the reactants include phenol.

4. The method of claim 2, wherein the reactants include at least one aryl aldehyde comprising 1–30 carbon atoms or at least one alkyl aldehyde comprising 1–30 carbon atoms, or at least one ketone selected from the group consisting of arylalkyl ketones, symmetrical dialkyl ketones, and unsymmetrical dialkyl ketones, wherein aryl and alkyl groups each independently comprise 1–30 carbon atoms.

5. The method of claim 4, wherein the reactants include acetone.

6. The method of claim 4, wherein the reaction comprises formation of at least one bisphenol of formula (I):

wherein $A^1$ represents an aromatic group; E represents an alkylene group, an alkylidene group, or a cycloaliphatic group; $R^1$ represents hydrogen or a monovalent hydrocarbon group; $Y^1$ represents an inorganic atom, a halogen atom, an inorganic group, nitro, an organic group, alkenyl, allyl, or hydrogen or a monovalent hydrocarbon group, or an oxy group OR wherein R is an alkyl group; the letter "m" represents any integer from and including zero through the number of positions on $A^1$ available for substitution; and "p" represents an integer from and including zero through the number of positions on E available for substitution.

7. The method of claim 6, wherein the reaction comprises formation of bisphenol A.

8. The method of claim 1, wherein the added volume increment comprises a substituted or unsubstituted monocyclic, monohydroxyaromatic compound, or a substituted or unsubstituted polycyclic, monohydroxyaromatic compound.

9. The method of claim 8, wherein the added volume increment comprises phenol.

10. The method of claim 1, wherein the added volume increment comprises at least one aryl aldehyde comprising 1–30 carbon atoms or at least one alkyl aldehyde comprising 1–30 carbon atoms, or at least one ketone selected from the group consisting of arylalkyl ketones, symmetrical dialkyl ketones, and unsymmetrical dialkyl ketones, wherein aryl and alkyl groups each independently comprise 1–30 carbon atoms.

11. The method of claim 1, wherein the added volume increment comprises acetone.

12. The method of claim 1, wherein the added volume increment comprises phenol and acetone.

13. The method of claim 2, wherein the reactants further include an acid catalyst.

14. The method of claim 13, wherein the acid catalyst comprises an ion exchange resin.

15. The method of claim 2, wherein the reactants further include a reaction promoter.

16. The method of claim 1, wherein the volume increment withdrawal occurs before, after, or contemporaneously with the volume increment addition.

17. The method of claim 1, wherein the loading, withdrawal, and addition steps are performed by a liquid or solid handling robot.

18. The method of claim 1, further including the step of controlling the size of the volume increments withdrawn and added and the time interval between the additions of the volume increments to obtain a desired reactor residence time.

19. The method of claim 1, wherein the volume increments are withdrawn from the reactor vessels by positioning a probe at a predetermined level in the reactor vessels and withdrawing reactor fluid until no further fluid can be withdrawn at that level.

20. The method of claim 1, wherein the time intervals and the volume increments are selected to obtain a desired space velocity defined by the following equation:

$$\Delta t = \frac{\rho \cdot \Delta V \cdot 60}{SV \cdot R}$$

wherein:

$\Delta t$=time interval (minutes);

$\Delta V$=volume increment added (microliters);

$\rho$=density of the volume increment added (grams per milliliter);

SV=space velocity (grams liquid feed per grams resin per hour); and

R=amount of resin (milligrams).

21. The method of claim 1, wherein the withdrawal and addition steps are controlled in the reactor vessels so as to produce sub-interval concentration gradients during the course of the reactions.

22. The method of claim 21, wherein large volume additions followed by sequential withdrawals of smaller volume increments are made to the reactor vessels at predetermined subintervals within the time interval.

23. The method of claim 1, wherein the volume increments withdrawn from the reactor vessels are analyzed for concentration of reactants and product.

24. The method of claim 1, wherein the volume increments withdrawn from the reactor vessels are pooled and then analyzed to provide cumulative concentration gradient data.

25. The method of claim 1, wherein after the reactions are allowed to proceed for a predetermined time interval, the volume increments are withdrawn and added simultaneously in each of the reactor vessels.

26. A method for high throughput screening of chemicals, catalysts, reactants, and process conditions in the reaction of phenol and acetone to produce bisphenol A in batch reactors emulating the conditions of continuous reactors by incremental flow, comprising the steps of:

(a) providing an array of reactor vessels and reactants;

(b) loading each of the reactor vessels with at least one reactant;

(c) allowing the reactions to proceed for a predetermined time interval;

(d) withdrawing a volume increment from each reactor vessel;

(e) adding a volume increment of at least one reactant to each reactor vessel; and thereafter (f) repeating steps (c), (d), and (e) until such time the reactions reach a substantially steady state.

27. The method of claim 26, further including the step of selecting the predetermined time intervals and the volume increments to obtain a desired space velocity.

28. The method of claim 27, wherein the desired space velocity is defined by the following equation:

$$\Delta t = \frac{\rho \cdot \Delta V \cdot 60}{SV \cdot R}$$

wherein:

$\Delta t$=time interval (minutes);

$\Delta V$=volume increment added (microliters);

$\rho$=density of the volume increment added (grams per milliliter);

SV=space velocity (grams liquid feed per grams resin per hour); and

R=amount of resin (milligrams).

29. The method of claim 26, wherein the added volume increment comprises phenol.

30. The method of claim 26, wherein the added volume increment comprises acetone.

31. The method of claim 26, wherein the added volume increment comprises phenol and acetone.

32. The method of claim 26, wherein the reactants further include an acid catalyst.

33. The method of claim 32, wherein the acid catalyst comprises an ion exchange resin.

34. The method of claim 26, wherein the reactants further include a reaction promoter.

35. The method of claim 26, wherein the volume increment withdrawal occurs before, after, or contemporaneously with the volume increment addition.

36. The method of claim 26, wherein the loading, withdrawal, and addition steps are performed by a liquid or solid handling robot.

37. The method of claim 26, further including the step of controlling the size of the volume increments withdrawn and added and the time interval between the additions of the volume increments to obtain a desired reactor residence time.

38. The method of claim 26, wherein the volume increments are withdrawn from the reactor vessels by positioning a probe at a predetermined level in the reactor vessels and withdrawing reactor fluid until no further fluid can be withdrawn at that level.

39. The method of claim 26, wherein the withdrawal and addition steps are controlled in the reactor vessels so as to produce sub-interval concentration gradients during the course of the reactions.

40. The method of claim 39, wherein large volume additions followed by sequential withdrawals of smaller volume increments are made to the reactor vessels at predetermined subintervals within the time interval.

41. The method of claim 26, wherein the volume increments withdrawn from the reactor vessels are analyzed for concentration of reactants and product.

42. The method of claim 26, wherein the volume increments withdrawn from the reactor vessels are pooled and then analyzed to provide cumulative concentration gradient data.

43. The method of claim 26, wherein after the reactions are allowed to proceed for a predetermined time interval, the volume increments are withdrawn and added simultaneously in each of the reactor vessels.

* * * * *